United States Patent [19]
Schad et al.

[11] Patent Number: 5,910,327
[45] Date of Patent: Jun. 8, 1999

[54] SPRUE BAR ASSEMBLY FOR A STACK MOLD

[75] Inventors: Robert Dietrich Schad, Toronto; Zbig Romanski, Etobicoke, both of Canada

[73] Assignee: Husky Injection Molding Systems, Canada

[21] Appl. No.: 08/936,569

[22] Filed: Sep. 24, 1997

[51] Int. Cl.⁶ .................................................. B29C 45/20
[52] U.S. Cl. ........................................ 425/572; 425/588
[58] Field of Search ..................... 425/572, 588

[56] References Cited

U.S. PATENT DOCUMENTS

| | | | |
|---|---|---|---|
| 4,207,051 | 6/1980 | Wright et al. | 425/556 |
| 4,212,626 | 7/1980 | Gellert | 425/562 |
| 4,611,983 | 9/1986 | Bielfeldt | 425/544 |
| 4,867,938 | 9/1989 | Schad et al. | 264/297.2 |
| 5,011,646 | 4/1991 | Bertschi | 264/297.2 |
| 5,040,969 | 8/1991 | von Buren et al. | 425/572 |
| 5,458,843 | 10/1995 | Brown et al. | 264/297 |
| 5,518,387 | 5/1996 | Di Simone | 425/139 |
| 5,522,720 | 6/1996 | Schad | 425/567 |

*Primary Examiner*—Tim Heitbrink
*Attorney, Agent, or Firm*—Fitzpatrick, Cella, Harper & Scinto

[57] ABSTRACT

A sprue bar assembly for a melt transfer system for stack molds comprises a sprue bar and a sprue bar sleeve. When the stack mold is opened, the sprue bar slides inside the sprue bar sleeve which captures any leakage therefrom. When the mold is closed, the sprue bar sweeps captured leakage out of the sleeve to an area outside the mold. As the bushing at the end of the sprue bar can contact the nozzle at a point very close to the edge of the fixed platen, the resulting minimum length of the sprue bar is reduced, reducing pressure losses through the sprue bar and reducing the cost of the sprue bar. The sprue bar sleeve can be fabricated from an insulating material to enhance the thermal characteristics of the sprue bar assembly and a scraper can be provided on the sprue bar to improve removal of captured material from the sprue bar sleeve.

17 Claims, 10 Drawing Sheets

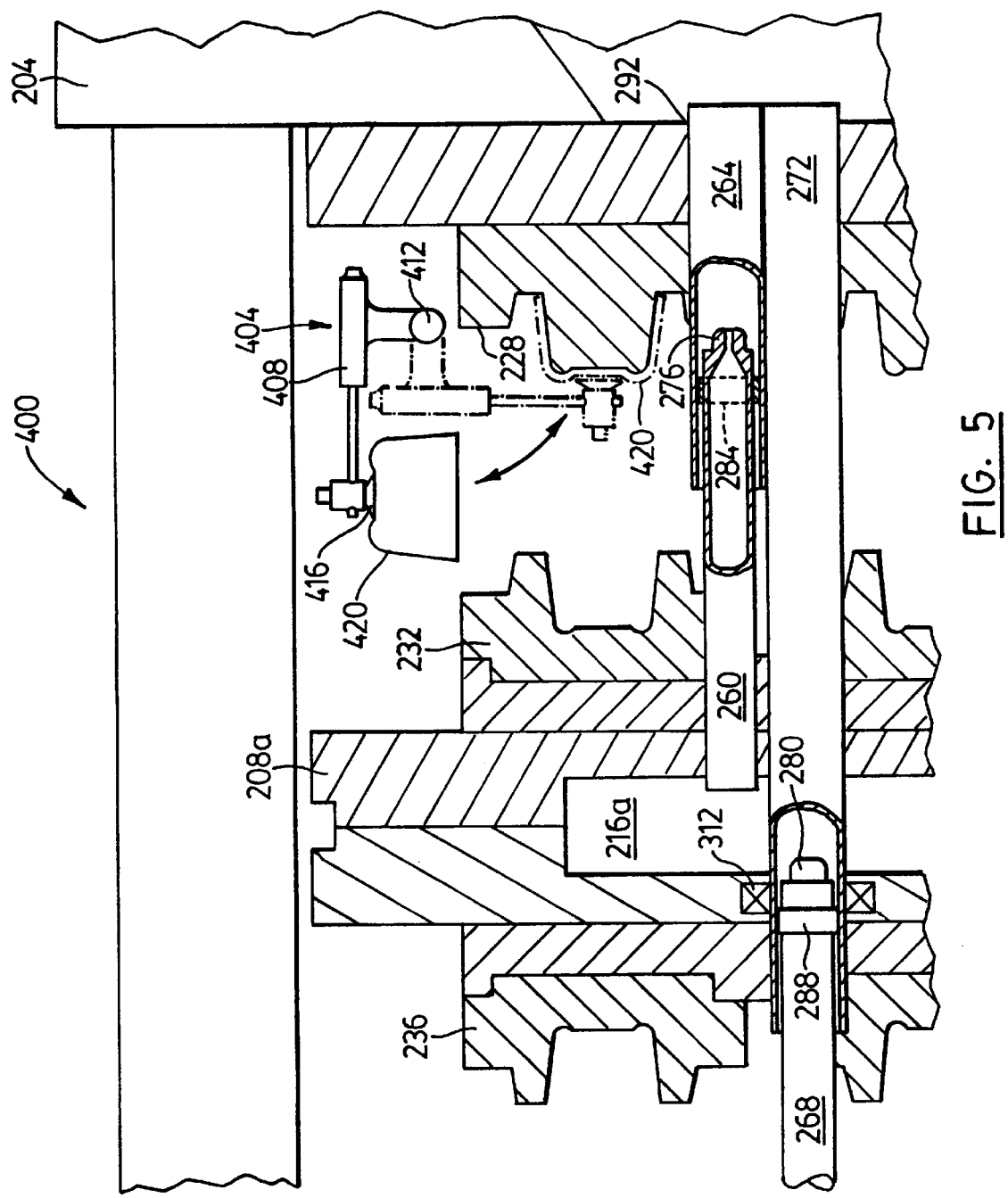

SPRUE BAR ASSEMBLY FOR A STACK MOLD

FIELD OF THE INVENTION

The present invention relates to injection molding machines and systems. More particularly, the present invention relates to stack molds or the like for injection molding and to a sprue bar assembly therefor.

BACKGROUND OF THE INVENTION

Stack molding is well known in the injection molding art and provides various advantages. In particular, stack molding enables the output of an injection molding machine to be at least doubled without significantly increasing its size or clamping tonnage. Stack molds are typically double or quadruple-level, although there could be any number of stacks in a molding machine. For example, some rubber molds use up to ten levels.

A double level stack mold generally comprises a stationary first platen, a movable center platen and a movable second platen, with two single face mold plates mounted back to back. A first mold (single cavity or multi-cavity) is defined by one of a mold cavity or core plate which is located on the face of the movable center platen adjacent the stationary first platen and the other of the mold cavity or core plate which is located on the stationary first platen. A second mold is defined by one of a mold cavity or core plate which is located on the other face of the moveable center platen adjacent to the movable second platen and the other of the mold cavity or core plate located on the moveable second platen. The molds are opened and closed by a single machine force actuator (generally a hydraulic ram) applied to the moveable second platen and transferred from the second platen to the center platen by a suitable linkage. In a quadruple stack mold, an additional two moveable platens are provided and mold cavity plates and/or mold core plates are located thereon to define additional molds.

To supply molten resin to the cavities of the closed molds, conventional stack molds employ a sprue bar which runs from the machine through the stationary platen to the center platen and which serves as a direct channel between the extruder nozzle of the injection molding machine and the mold's hot runner distributor, which is mounted in the center platen of the stack mold. Alternatively, a movable sprue bar located outside of the mold stack can convey the resin to the center section, as described by Bertschi in U.S. Pat. No. 5,011,646. Sprue bars generally include heaters along their length to maintain the molten state of the resin travelling therethrough and must cope with the relatively high pressure at which the molten resin passes through them.

For injection molding applications where there are more than two levels in the stack mold, multiple sprue bars can be used for delivering a split stream of molten resin to the hot runner distributors in the multi-level injection mold. In this case, after the resin stream is split, the sprue bars carry the resin to the hot runner distributors in their respective mold sections comprising the injection mold. With multi-sprue bar applications, a single source injection unit channel is typically used with a machine nozzle that divides the single source channel into a plurality of channels aligned with the individual sprue bars, as described in U.S. Pat. No. 5,522,720 to one of the present inventors, and assigned to the assignee of the present invention.

In such cases, the sprue bars are normally attached to the respective mold section to which the molding resin is being delivered. Because injection mold sections in a multi-level stack mold generally move in the longitudinal or vertical direction when the mold is open and closed, the sprue bars must be displaced with the mold sections. Accordingly, the sprue bars are not rigidly attached to their source of resin, i.e.—the machine nozzle or the channel splitting device. Consequently, the sprue bar arrangement must be designed so that the sprue bars will return to their sources of resin and reform a seal therewith at the beginning of each molding cycle.

In particular, several design problems are typical for stack molds with more than two levels where resin must flow from a single source injection unit to multiple levels spaced progressively farther from the stationery platen. For example, in a four level stack mold, a sprue bar will feed the first and second level via channels in the mold plate between the two levels and a second sprue bar will feed the third and fourth levels via channels in the mold plate between these two levels. It is desired that sprue bars be as short as possible to reduce pressure losses and to minimize the manufacturing expense of the sprue bars. A further difficulty occurs as, due to the progressive arrangement, the two sprue bars will necessarily be of different lengths and thus the pressure drop that occurs between the inlet end of the sprue bar adjacent to the injection nozzle and the outlet end of the bar is much larger in the longer sprue bar than in the shorter.

When molding shallow parts, and thus opening the mold to a relatively small degree, the length of the sprue bars is generally not large, and the difference in the sprue bar length is relatively small. Consequently, the pressure drop is of minor consequence, generally on the order of 3 to 5 MPa. However, a relatively large pressure drop, on the order of 25 MPa, can occur when molding tall parts because the sprue bars are necessarily longer. This large pressure drop must be compensated for at the injection molding machine and, more importantly, the differential in the pressure drop between the sprue bars can cause insufficient mold packing in the molds furthermost from the injection nozzle.

Another difficulty with sprue bars is that variations in their length occur due to thermal expansion effects, as the sprue bars are heated to allow resin to flow through them. Accordingly, when the mold is closed, the position of the end of each sprue bar relative to the stationery platen and the channel splitting nozzle on the injection molding machine will vary, due to these thermal variations and due to variations in the position in which the mold plates close at the various levels. The combination of these variables makes it very difficult to predict the location of the two sprue bar ends each time the mold is closed and the sprue bar is returned to the channel splitting nozzle. Therefore, some resin leakage from the joint between the nozzle and the sprue bars is inevitable. Resin also tends to leak or "drool" from the nozzle gates or the open channel of the sprue bars when the mold is opened. This drool cannot be tolerated at any of the parting lines of the mold cavity and core sections. At best, such drool prevents complete mold closing and allows flashing to occur and, at worst, can cause permanent damage that requires expensive repairs.

U.S. Pat. No. 5,522,270 to one of the present inventors, and assigned to the assignee of the present invention, discloses a nozzle that tolerates misalignment with the two sprue bars while still forming a tight and repeatable seal between the sprue and the nozzle. Although this design overcomes the problem of drool between the nozzle and sprue bar during injection (mold closed), it does not solve the problem of drool from the gates when the mold opens, or the substantial pressure drops due to the lengths of the two sprue bars.

U.S. Pat. No. 4,207,051 to one of the present inventors and assigned to the assignee of the present invention shows a stack mold wherein molten resin is supplied to a center platen through a telescoping tube assembly which is mounted externally to the mold. Essentially, the two tubes form an expandable single sprue bar to deliver molten resin to the mold hot runner and the sprue bar thus need not be detached from the injection nozzle. However, it has proven difficult to construct and operate such a telescoping tube system to accommodate the very high injection pressures (exceeding 20,000 psi) experienced at the nozzle in a multi-cavity, multi-level stack arrangement.

U.S. Pat. No. 5,458,843 discloses a four level stack mold that utilizes a single sprue bar with feed connectors extending through mold components. Drool is reduced via a valveless anti-drool arrangement whereby a spring-activated extension of an outwardly tapered piston into the manifold flow passage reduces its internal pressure and thereby minimizes backflow and resin drool from the feed connector. However, no provision is made for the possibility of drool in the central distributor side of the feed connector. Therefore, the risk of leakage at the mold parting line still exists.

U.S. Pat. No. 4,212,626 to Gellert dispenses with sprue bars entirely and instead uses a combination of control valve units abutted together to transfer the pressurized melt through mechanically operated valve gates from the stationary platen, where the machine nozzle resides, to the moving platen, where the hot runner manifold resides. Several problems are inherent in this approach. First, drool at the parting lines is likely to occur over time, as the valve gates must remain aligned at the parting mold faces with extreme precision over millions of injection cycles. Second, melt channel capacity is limited by the size of the valve gates through which the melt must pass through. Therefore, large parts cannot be successfully molded using this arrangement. Third, the mold shut height is much greater to accommodate the arrangement of the valve gate construction, leading to slower cycle times and greater material expense (the platens are thicker and therefore have greater mass).

U.S. Pat. No. 4,611,983 to Bielfeldt discloses a transfer molding system for fiber-reinforced thermoset resins whereby the molten resin is transferred to an injection cylinder via a feed bore. The injection piston is connected to a telescoping sleeve, so that as the piston moves up inside the injection cylinder to fill the mold cavity with resin, the sleeve also rises and seals off the feed bore. Also, the inner diameter of the sleeve is larger than the root diameter of the injection piston, so that any resin drool flows out of the annular clearance. However, this technique suffers from various disadvantages and does not work if applied to a high injection pressure, multi-cavity, multi-level stack mold arrangement with at least two hot runner systems.

Accordingly, it is desired to have a stack mold and a sprue bar assembly therefor which does not suffer from the above-mentioned or other disadvantages.

SUMMARY OF THE INVENTION

It is an object of the present invention to provide a novel stack mold and a sprue bar assembly therefor that obviates or mitigates at least one of the disadvantages of the prior art.

According to a first aspect of the present invention, there is provided a stack mold comprising:

a fixed mold platen;

at least one center mold platen having a first side adjacent said fixed mold platen and a second side opposite said first side, said center mold platen including a mold hot runner and being movable with respect to said fixed mold platen;

a driven mold platen distal said fixed mold platen and said at least one center mold platen and movable with respect to said fixed mold platen and said at least one center mold platen, said driven mold platen connected to a mold clamping unit operable to move said at least one center mold platen and said driven mold platen to close said stack mold such that a first complete mold cavity is formed between said fixed mold platen and said first side of said at least one center mold platen and a second complete mold cavity is formed between said second side of said center platen and said driven mold platen;

a sprue bar extending from, and in fluid connection with, said mold hot runner in said at least one center platen, said sprue bar having a bushing distal said mold hot runner to engage an injection nozzle and having a length sufficient to permit said bushing to engage said injection nozzle when said stack mold is closed; and a sprue bar sleeve for said sprue bar, said sprue bar sleeve extending substantially perpendicularly with respect to said fixed mold platen from an injection machine nozzle reception area toward said mold hot runner such that said bushing of said sprue bar slides within said sprue bar sleeve, said sprue bar sleeve having a sufficient length such that said bushing does not exit said sprue bar sleeve when said center platen is distal said fixed platen and said bushing extending from said sprue bar sleeve to engage said nozzle when said first complete cavity closed.

According to another aspect of the present invention, there is provided a sprue bar assembly for a stack mold comprising a fixed platen, at least one moveable center platen having at least one mold hot runner, and a driven platen, comprising:

a sprue bar having a first end to sealingly engage said at least one mold hot runner in one of said moveable center platens and a second end including a bushing to engage an injection molding machine nozzle;

a sprue bar sleeve to slidably receive said second end of said sprue bar and to capture leakage therefrom, said sprue bar engaging the interior of said sprue bar sleeve to sweep captured leakage therefrom as said second end of said sprue bar slides into said sprue bar sleeve.

BRIEF DESCRIPTION OF THE DRAWINGS

Preferred embodiments of the present invention will now be described, by way of example only, with reference to the attached Figures, wherein:

FIG. 5 shows a portion of a cross-section through another embodiment of a stack mold, in accordance with the present invention, in an open position;

DETAILED DESCRIPTION OF THE INVENTION

Figure 1:
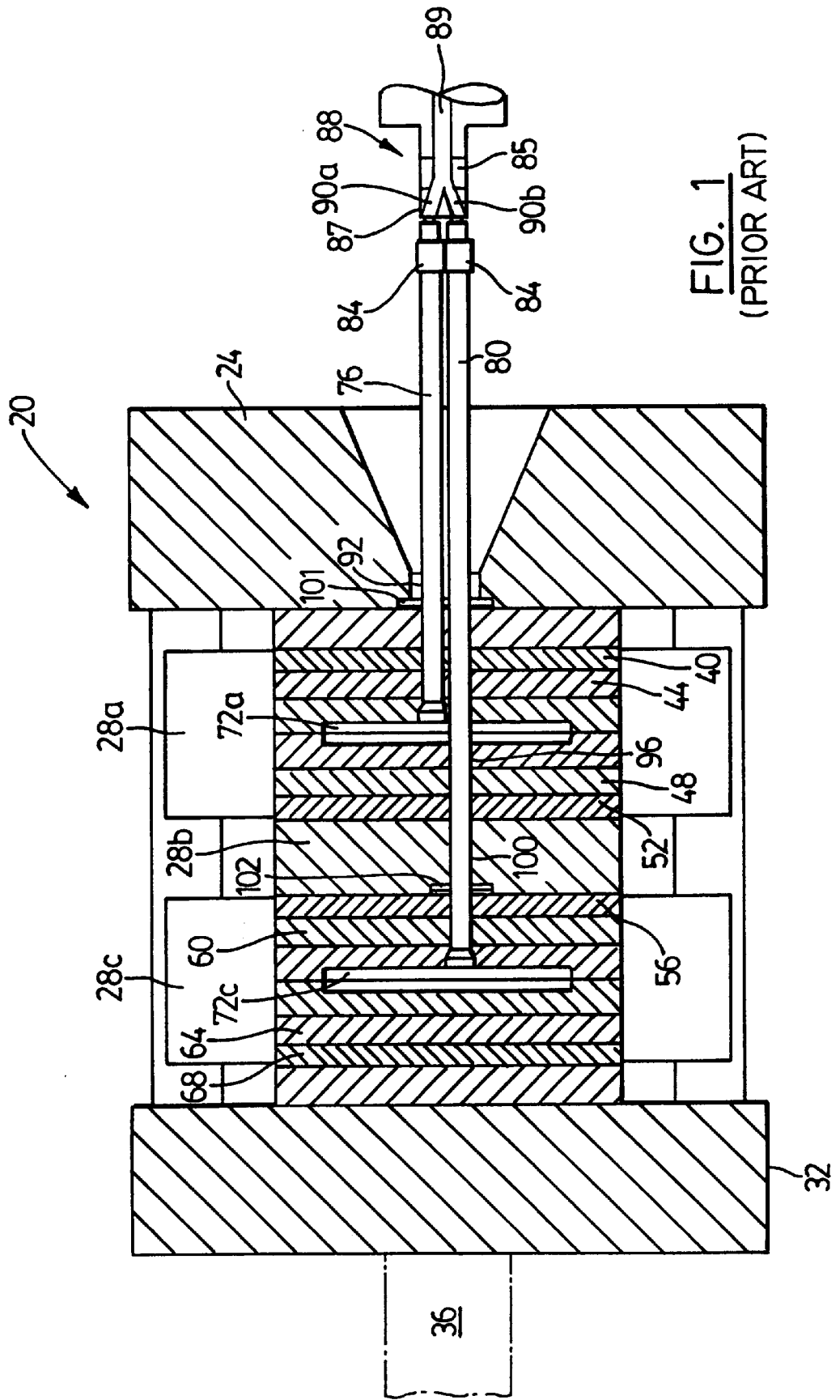
FIG. 1 shows a cross-sectional side view of a prior art stack mold in a closed position.
Figure 2:
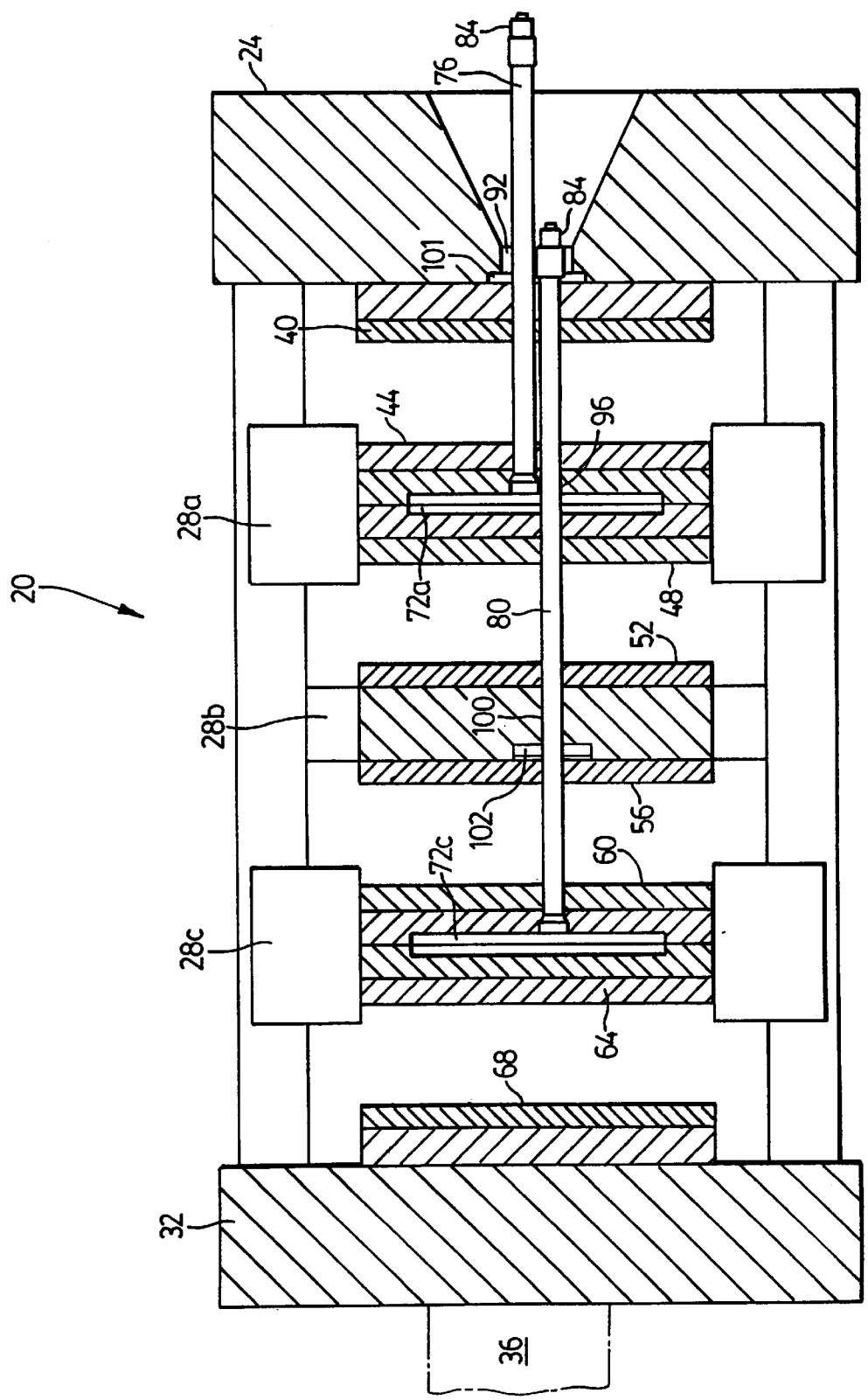
FIG. 2 shows a cross-sectional side view of the prior art stack mold of FIG. 1 in an open position.

While the present invention will be described in detail below, for clarity a prior art stack mold will first be described, with reference to FIGS. 1 and 2. In FIG. 1, a prior art stack mold is indicated generally at 20 and comprises a fixed platen 24, three moveable center platens 28a, 28b and 28c and a driven, moveable platen 32 which is moved by a mold clamping unit, such as hydraulic ram 36, indicated in dashed line.

Fixed platen 24 includes a core plate 40 which, with a cavity plate 44 on one side of center platen 28a, defines a complete mold therebetween when mold 20 is closed. Center platen 28a also includes a cavity plate 48 on the opposite side to that of cavity plate 44 which, in combination with a core plate 52 on one side of center platen 28b defines another complete mold when mold 20 is closed. Center platen 28b includes a core plate 56 on the opposite side to that of core plate 52 which, in combination with a cavity plate 60 on one side of center platen 28c defines another complete mold when mold 20 is closed. Finally, in this example, the complete mold is defined by a cavity plate 64 on the opposite side of center platen 28c and a core plate 68 on driven platen 32. As will be apparent to those of skill in the art, each defined mold can comprise any desired number of cavities.

As shown in the Figure, center platens 28a and 28c include hot runners 72a and 72c, formed between the mold cavity plates to distribute molten resin to the completed molds and molten resin is supplied hot runner 72a via sprue bar 76 and molten resin is supplied to hot runner 72c via sprue bar 80. As shown, each of sprue bar 76 and sprue bar 80 includes a bushing 84 to engage an injection machine nozzle 88. An adapter 85 connects the nozzle 88 to the nozzle tip 87 and includes a channel 89 whereby the resin flows into nozzle tip 87 from nozzle 88. Channel 89 connects with two diverging channels 90a and 90b that are in fluid communication with sprue bars 76 and 80, such that the flow of molten resin from nozzle 88 passes through adapter 85, into nozzle tip 87 where it is divided into two separate flows which enter a respective one of sprue bars 76 and 80. Sprue bars 76 and 80 extend from nozzle tip 87 to their respective hot runners through an aperture 92 in fixed platen 24 and through apertures in each intermediate center platen 28.

Specifically, sprue bar 80 extends through aperture 92 and through an aperture 96 in center platen 28a and an aperture 100 in center platen 28b to connect to hot runner 72c in center platen 28c, while sprue bar 76 extends through aperture 92 to connect to hot runner 72a. Because of the considerable length of each sprue bar, guides 101 and 102 are provided close to the fixed platen 204 and center platen 286, respectively to support sprue bars 76 and 80 and to reduce undesired deflection thereof FIG. 2 shows mold 20 in an open position. As can be seen in the Figure, the length of sprue bar 80 has been selected to ensure that bushing 84 does not enter the mold 20 when it is fully opened. As bushing 84 on each sprue bar 76 and 80 must engage injection nozzle 88, the length of sprue bar 76 is selected such that it will extend to the same degree as sprue bar 80 when mold 20 is closed. Thus, sprue bar 76 is somewhat longer than is required to ensure that its bushing 84 not enter mold 20 when opened and, further, injection nozzle 88 must be located farther from mold 20 than would other wise be desired.

Figure 3:
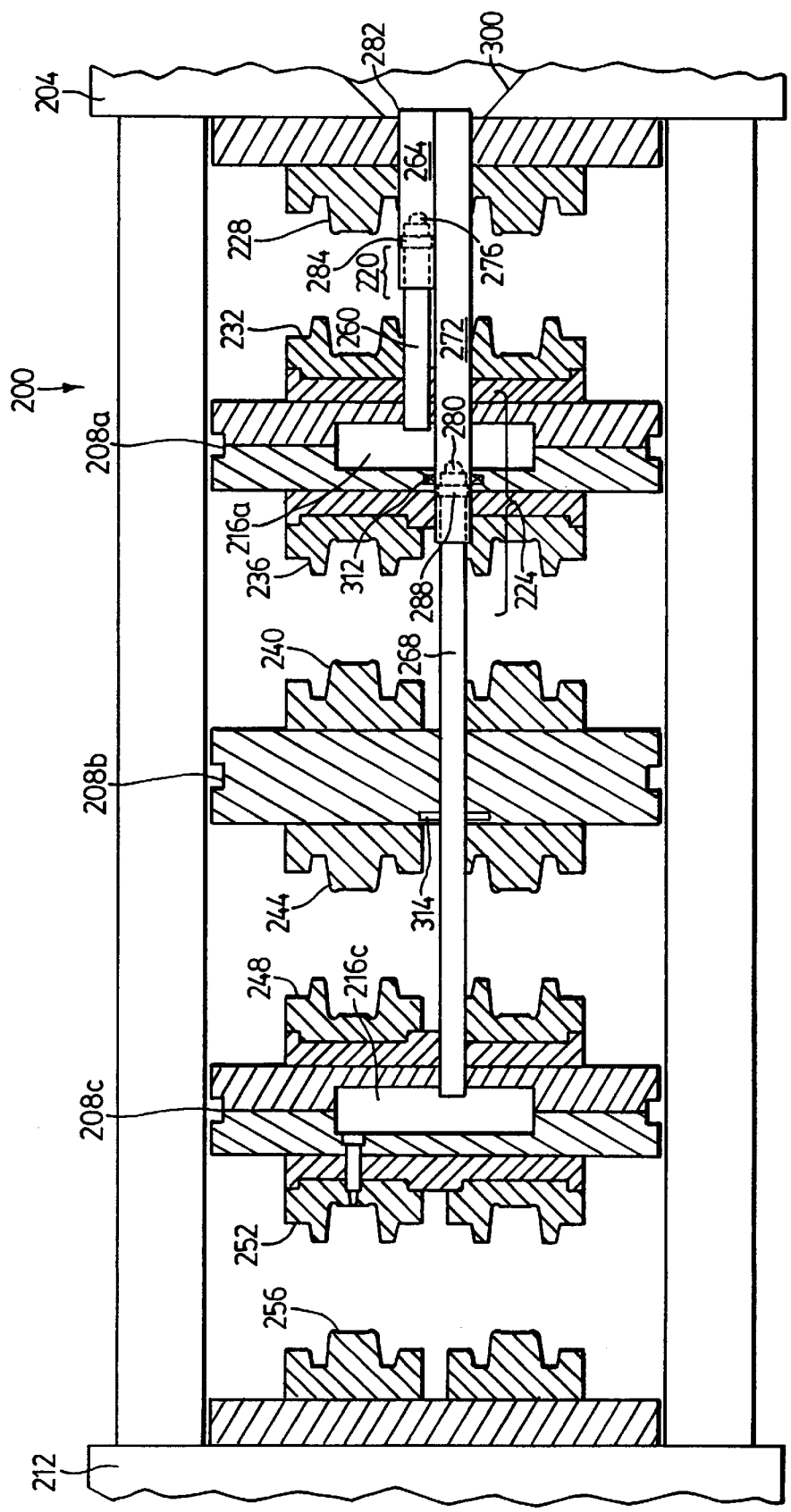
FIG. 3 shows a cross-sectional side view of a stack mold in accordance with the present invention in an open position.
Figure 4:
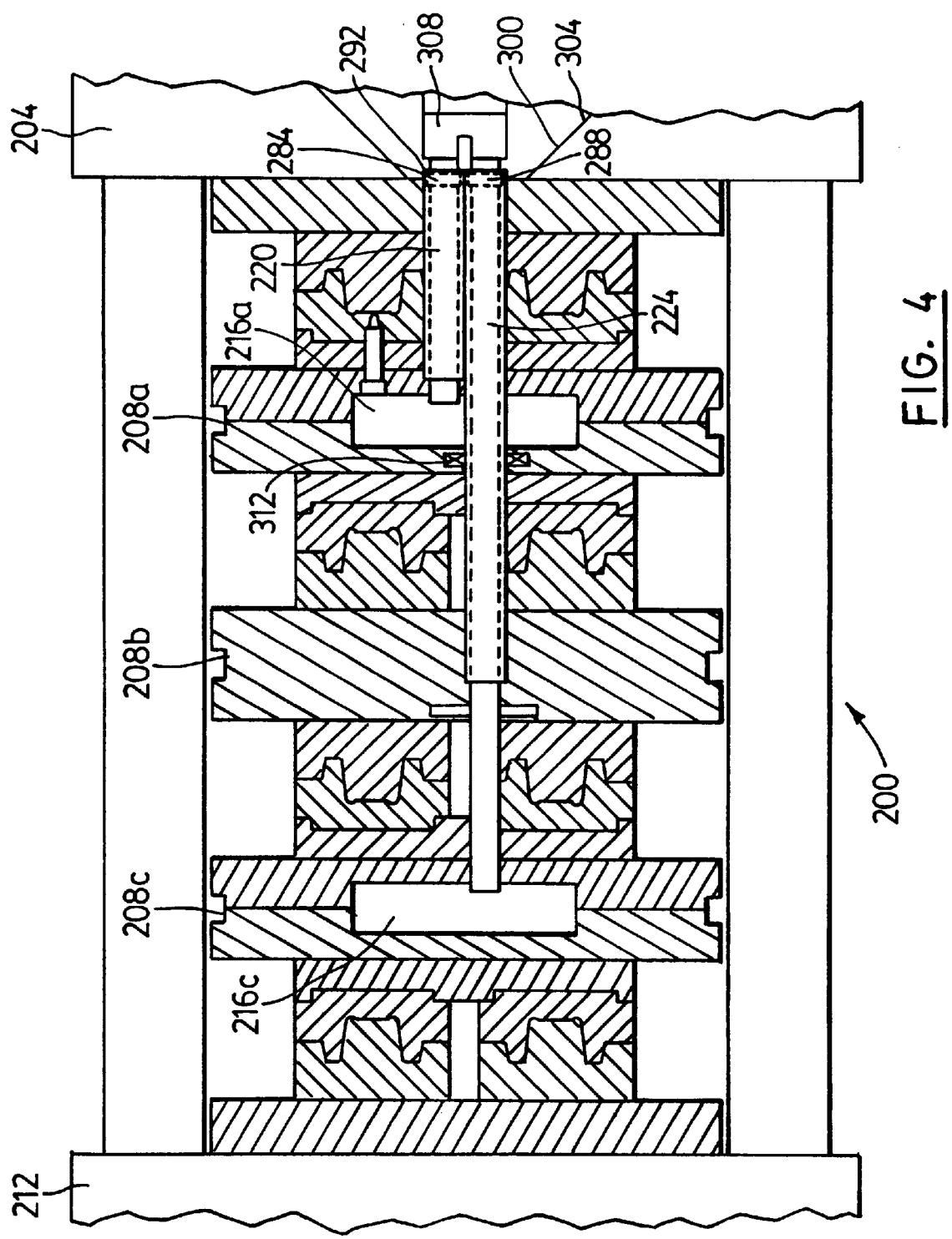
FIG. 4 shows a cross-sectional side view of the stack mold of FIG. 3 in a closed position.

FIGS. 3 and 4 shows a stack mold 200 in accordance with an embodiment of the present invention. As shown, mold 200 is quite similar to mold 20 described above and includes a fixed platen 204, three moveable center platens 208a, 208b and 208c and a driven platen 212. Center platens 208a and 208c include hot runners 216a and 216c, formed between the mold cavity plates and which are supplied with molten resin by sprue bar assemblies 220 and 224, respectively. Fixed platen 204 includes a core plate 228, center platen 208a includes cavity plates 232 and 236 on opposite sides, center platen 208b includes core plates 240 and 244 on opposite sides and center platen 208c includes cavity plates 248 and 252 in opposite sides and, finally, driven platen 212 includes a core plate 256. As will be apparent to those of skill in the art, the cavities in cavity plates 232 and 236 are in fluid communication with hot runner 216a and the cavities in cavity plates 248 and 252 are in fluid communication with hot runner 216c.

Sprue bar assembly 220 comprises a sprue bar 260 and a sprue bar sleeve 264. In a similar fashion, sprue bar assembly 224 comprises a sprue bar 268 and a sprue bar sleeve 272. Sprue bars 260 and 268 are quite similar to known sprue bars in that they are able to contain large pressures and include heater elements to maintain molten resin in a molten state. Each sprue bar 260 and 268 also includes a sealing bushing 276 and 280, respectively, at one end and which can be a conventional bushing used for sprue bars. Additionally, each sprue bar 260 and 268 can further include a scraper 284 and 288 which is formed of a suitable material, such as titanium dioxide, and is described in more detail below.

Each bushing 276 and 280, and its respective sprue bar 260 and 268, rides within its respective sprue bar sleeve 264 and 272 such that bushings 276 and 280 can enter mold 200 through an aperture 292 in fixed platen 204 without the possibility of drool from the bushings interfering with closing or operation of mold 200. Any drool which does leak from bushings 276 and 280 is captured by the respective sprue bar sleeve 264 and 272 and remains therein until mold 200 is closed.

As shown in FIG. 4, when mold 200 is closed, bushings 276 and 280, and their associated scrapers 284 and 288, if present, are swept through sprue bar sleeves 264 and 272, pushing any drool captured within the sleeves before them. As sprue bar sleeves 264 and 272 terminate at aperture 292 in fixed platen 204, any drool 300 which was captured in either sprue bar sleeve 264 and 272 is swept out of its respective sleeve into aperture 292 and falls down an inclined surface 304 to a suitable capture container, not shown. Bushings 276 and 280 extend sufficiently from sleeves 264 and 272 to engage an injection nozzle 308 and a conventional injection cycle can be performed.

To ensure that the inner ends (those distal fixed platen 204) of sprue bar sleeves 264 and 272 align with the apertures through the center platens 208 as mold 200 is closed, one or more guide bearings can be provided about the apertures to provide additional support and alignment forces to the sprue bar sleeves. For example, in mold 200 a guide bearing 312 is provided in center platen 208a to support the inner end of sprue bar sleeve 272. These guide bearings can be similar to those conventionally employed to support relatively long sprue bars. In FIG. 3, sprue bar 268 is supported by a conventional sprue bar guide 314 in center platen 208b, due to its long length, while in this example sprue bar 260 is not supported by a sprue bar guide, due to its relatively short length.

As will be apparent to those of skill in the art, the required length of sprue bars 260 and 268 is significantly less than the lengths which would be required in a conventional stack mold without sprue bar sleeves 264 and 272. As mentioned above, this reduction in the required lengths of the sprue bars reduces the cost of the stack mold (as sprue bars are expensive, including heater elements along their length and having to contain high pressures, relative to the cost of the sleeves) and allow the injection nozzle 308 to be located closer to mold 200.

The minimum length of sprue bars 260 and 268 in a mold in accordance with the present invention is the length required to effect a fluid connection between the respective hot runners 216a and 216c and the injection nozzle 308 when mold 200 is closed. The minimum length of sprue bar sleeves 264 and 272 is a length extending from fixed platen 204 into mold 200 to an extent such that the sealing bushing of the sprue bar, and the scraper (if present), is not drawn out of the sleeve when the mold is in the open position.

As will also be apparent, the reduction in the otherwise required length of sprue bar 268 is greater than the reduction in sprue bar 260 and sprue bar sleeve 264 could be omitted with only a relatively small increase being required in the length of sprue bar 260. Thus, in less preferred circumstances, a stack mold in accordance with the present invention can be fabricated with one or more of the relatively shorter sprue bars not having corresponding sprue bar sleeves while longer sprue bars in the mold are so equipped.

While sprue bars 260 and 268 can be any shape in cross section, it is presently preferred that they have a circular cross section and that their respective sleeves have a corresponding circular cross section. In such a case, scrapers 284 and 288 can be formed as rings which surround the sprue bar and with an exterior diameter which is closely toleranced to the interior diameter of sprue bar sleeves 264 and 272. In such a case, scrapers 284 and 288 can also serve as a support and/or bearing surface for the respective sprue bar as it is swept into or out of its respective sleeve. If scrapers are not provided, bushings 276 and 280 should be dimensioned to be closely toleranced to the interior dimensions of sprue bar sleeves 264 and 272.

It will be apparent to those of skill in the art that other cross sectional shapes can be employed and that the sprue bars and sprue bar sleeves do not have to have the same cross sectional shape. For example, it may be desired that the sprue bar have a circular cross section to improve its pressure handling capacity while the corresponding sprue bar sleeve has a generally square cross section to stiffen the sleeve. In such a case, it is only required to select components with suitable dimensions for the sprue bar and the sprue bar sleeve and to provide a scraper with the required different exterior and interior shapes.

Presently, it is preferred that scrapers 284 and 288 be fabricated from titanium dioxide as this material copes well with the high temperatures of molten resins, is relatively hard and long wearing and provides a reasonable degree of insulation to reduce heat transfer between the sprue bar and the sprue bar sleeve. It will be understood by those of skill in the art however, that other materials can also be employed, if desired.

It is also presently preferred that sprue bar sleeves be fabricated from titanium dioxide, or any other material which is capable of withstanding the temperatures in the mold and which can act as thermal insulators, inhibiting heat loss from the sprue bars to the rest of the mold.

FIG. 5 shows another embodiment of the present invention wherein a portion of a mold 400 is shown. Mold 400 is essentially the same as mold 200, described above, and like components therein are numbered with like reference numerals. As is known, stack molds sometimes experience difficulties in ejecting finished parts from the mold as they may contact the sprue bars instead of falling clear of the opened mold. Accordingly, in some circumstances it is desired to have a means to ensure the unobstructed removal of finished parts from the mold. In FIG. 5, mold 400 has been provided with one or more finished part ejectors 404. Finished part ejector 404 comprises an arm 408 which is rotatably mounted at one end to a drive means, not shown, and which includes a vacuum gripper 416 at the opposite end. In use, as mold 400 is opened, arm 408 rotates to the position shown in chain line in the Figure to bring vacuum gripper 416 into contact with a finished part 420. A vacuum is then applied and arm 408 is rotated to the position shown in solid line in the Figure, pulling part 420 off of core plate 228 and away from the interior of mold 400. The vacuum is then removed from vacuum gripper 416 to allow part 420 to fall clear of mold 400 and the mold can be closed for another injection cycle.

A part ejection system which is suitable for use with the present invention is shown in U.S. Pat. No. 5,518,387 to Di Simone and assigned to the assignee of the present invention. The contents of this patent are incorporated herein by reference.

While the particular configuration of part ejector 404 is that presently preferred, it will be apparent to those of skill in the art that other configurations of part ejectors can be employed with stack molds in accordance with the present invention.

As will be apparent to those of skill in the art, the present invention is not limited to multi-level stack molds in which each sprue bar carries a portion of a single type of molten resin supplied from an injection machine. In some circumstances, two or more separate machine injector nozzles can be employed to supply different resins to sprue bars feeding different cavities. For example, in a four level embodiment, finished parts molded in the two molds furthest away from the fixed platen can be molded from a different resin composition or color than parts made in the two molds closest to the fixed platen, having been supplied with different molten resins via their respective sprue bars.

As will also be apparent to those of skill in the art, the present invention can also be employed with an injection molding machine having at least two molding stations arranged in tandem, such as those machines described in U.S. Pat. No. 4,867,938 and its continuations, U.S. Pat. Nos.: 4,981,638; 5,052,915; 5,055,250; 5,073,328; 5,112,558; and 5,185,119, to Brown and Schad, and in U.S. Pat. No. 5,040,969, and its re-issue Re35,256 to von Buren and Paulovic, all assigned to the assignee of the present invention and the contents of these patents are incorporated herein by reference. While strictly speaking tandem machines are not stack molds, as used herein the term "stack mold" is intended to comprise both multi-level stack molds and tandem molds.

FIGS. 6a through 6d show a prior art tandem machine, identified generally at 500, similar to those described in some of the patents mentioned above. These tandem machines are similar to stack molds in that they include at least one center platen 504 to operate at least two molds 508 and 512 defined between cavity plates on center platen 504 and core plates on driven platen 516 and fixed platen 520 respectively. These molds are operated in series, rather than in parallel as is the case for the stack molds described above, in a four step cycle shown in FIGS. 6a through 6d.

Figure 6A:
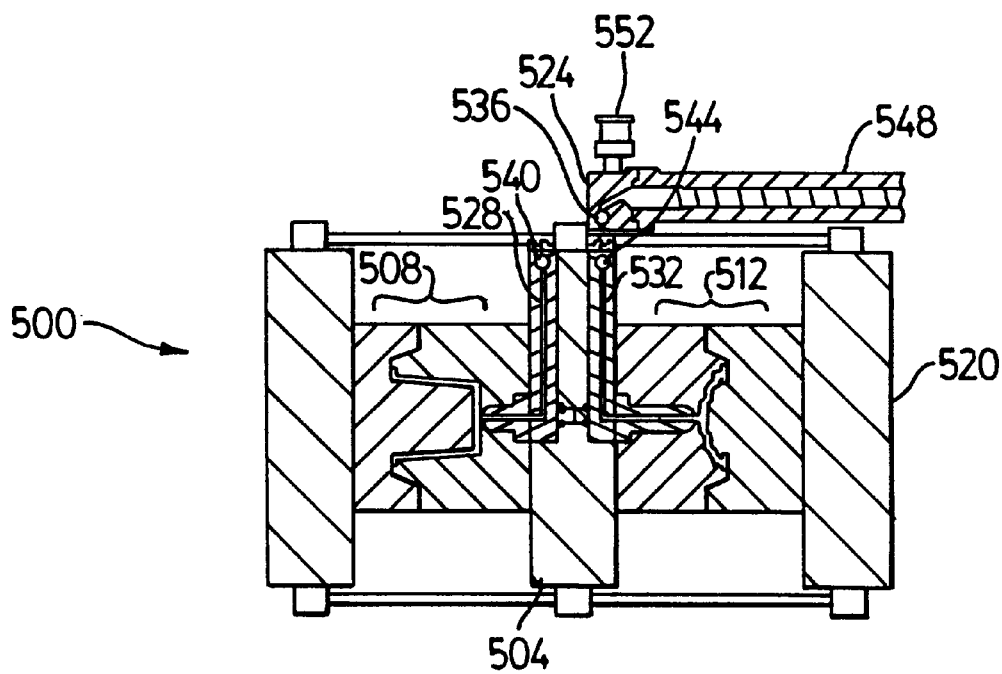
FIGS. 6a through 6d show a schematic view of the four stages of a prior art tandem mold.
Figure 6B:
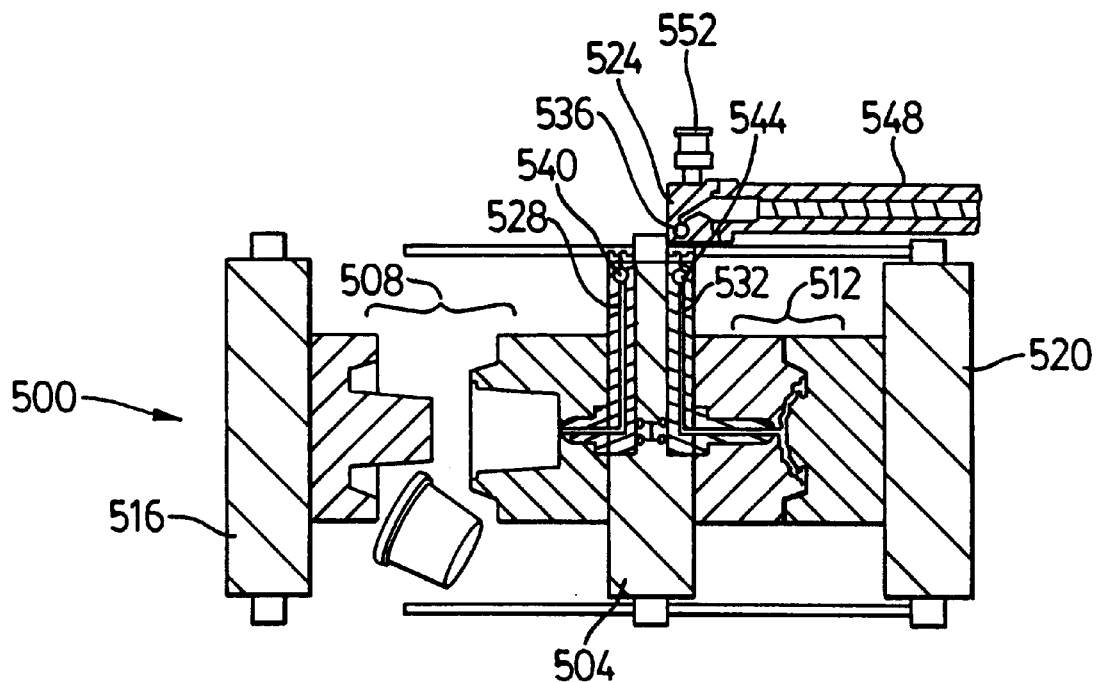
Figure 6C:
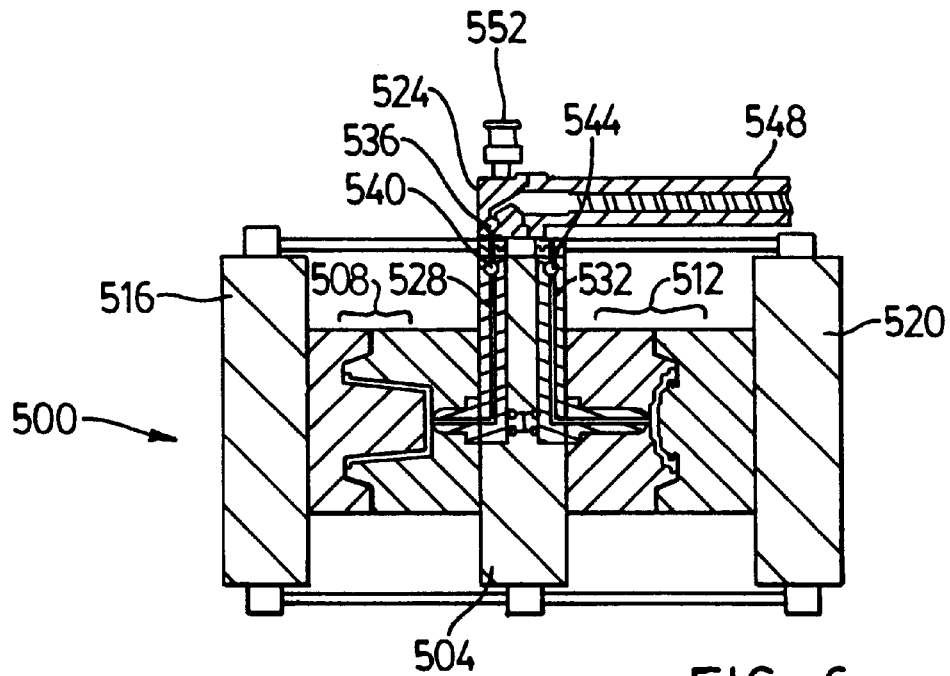
Figure 6D:
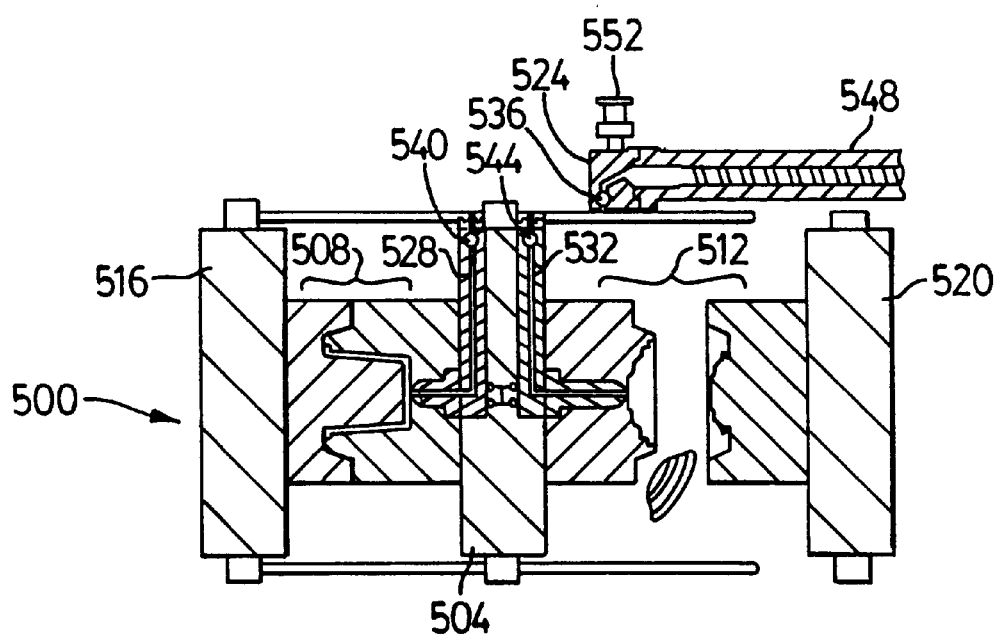

In the step shown in FIG. 6a, an injection operation is performed into mold 512 while a previously molded article is cooled in mold 508. In the step shown in FIG. 6b, mold 508 is opened and the molded article therein ejected while the molded article in mold 512 is cooled. In the step shown in FIG. 6c, mold 508 is closed and an injection operation is performed therein while the article in mold 512 is cooled. In the step shown in FIG. 6d, mold 512 is opened to eject the molded part therein by moving center platen 504 and driven platen 516 away from fixed platen 520, mold 508 remaining closed and cooling the part therein. The process then repeats with the step illustrated in FIG. 6a. As will be apparent to those of skill in the art, the duration of each step need not be the same and thus a larger molded article can be cooled for a longer period of time than a smaller article. In the illustrated example, the molded article in mold 508 is cooled for a longer period of time than the molded article in mold 512 and thus the steps shown in FIGS. 6a and 6d have a longer duration than the other two.

In addition to operating in serial, rather than in parallel manner, in tandem machines the injector nozzle 524 is offset to the top or side of the injection molding machine and directly feeds only one hot runner 528 or 532 and mold 508 and 512 respectively, at a time, rather than all molds in parallel. In this arrangement, hot runners 528 and 532 are not combined in the mold cavity plates, as is the case in the stack molds described above, but rather are located in central platen 504. Injector nozzle 524 locks onto one of hot runners 528 and 532 and a series of shut-off valves, including a valve 536 located in nozzle 524 and a valve 540 and 544 in each respective hot runner 528 and 532 are operated so that resin flows into the respective one of molds 508 and 512 while the other of molds 508 and 512 is cooling. The extruder 548, nozzle 524 and valve 536 are moved as an assembly between the mold stations to the mold inlets to feed the hot runners.

As can be readily appreciated, an inherent requirement in this design is a secondary clamping means 552 for clamping nozzle 524 to the mold inlets, the clamping force being along an axis that is generally perpendicular to the longitudinal axis of the primary clamping means needed to open and close molds 508 and 512. A further inherent requirement of this design is an additional means to move the assembly of secondary clamping means 552, nozzle 524 and extruder 548 between the mold stations.

Figure 7:
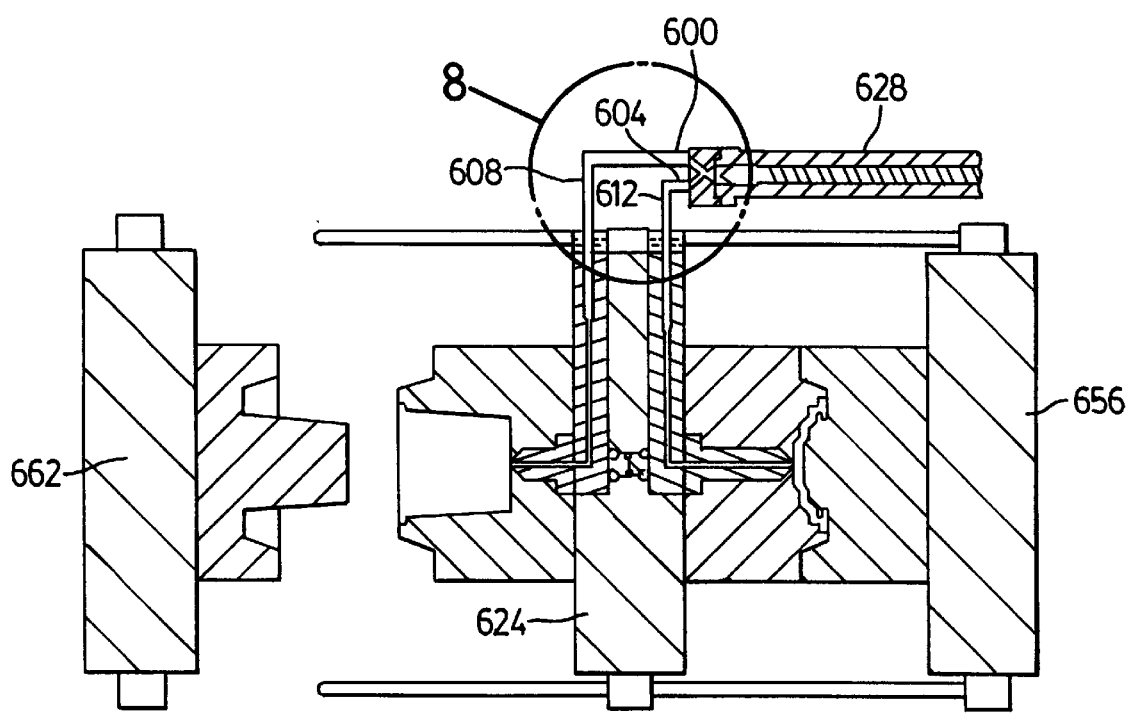
FIG. 7 shows a schematic representation of a side view of a tandem mold employing a sprue bar assembly in accordance with the present invention.
Figure 8:
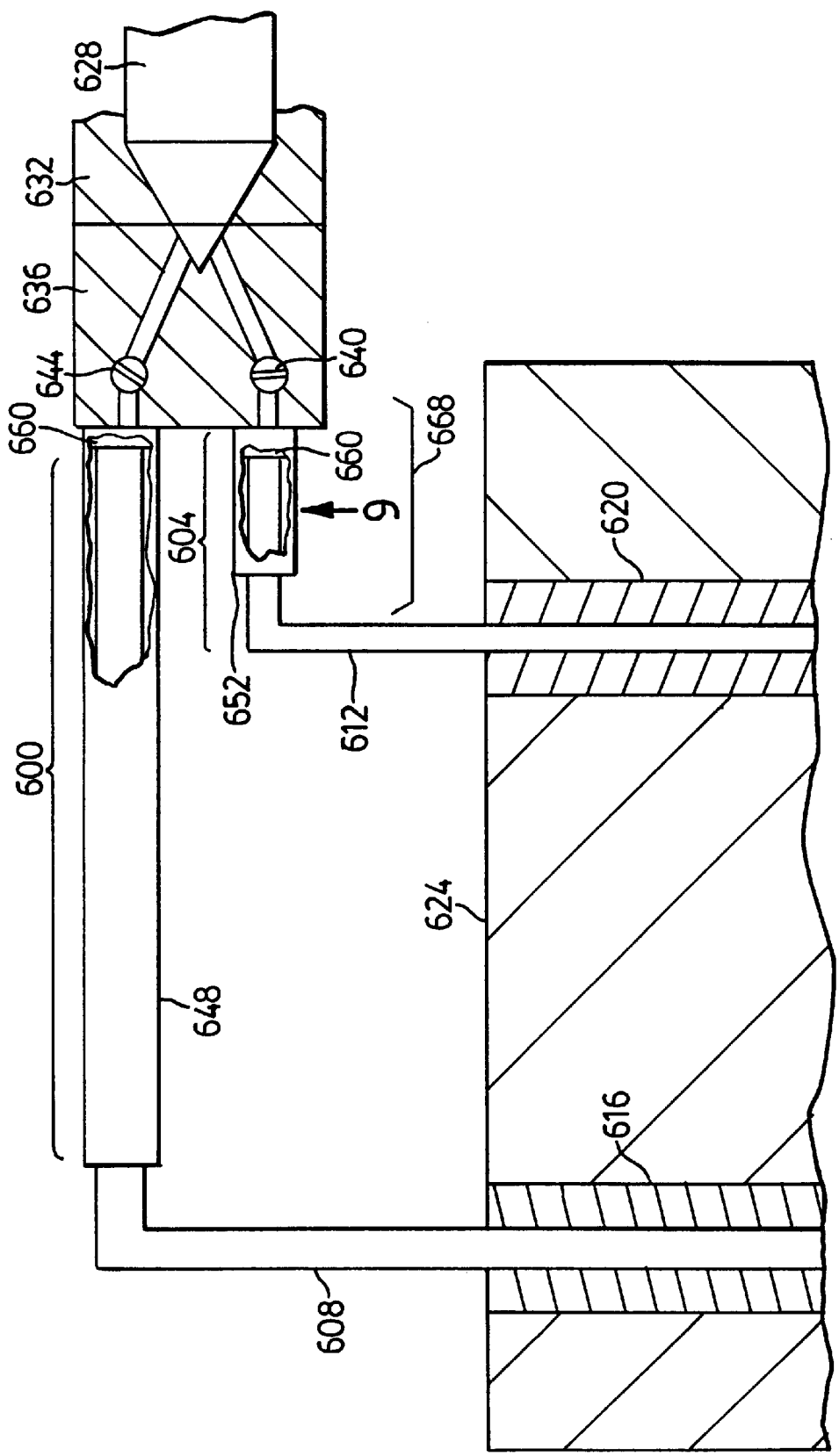
FIG. 8 shows an expanded view of the area within the circle labeled 8 in FIG. 7.

As illustrated in FIGS. 7 and 8, the present invention can eliminate the need for both the secondary clamping means and the supply means. Two sprue bar assemblies 600 and 604, best seen in FIG. 8, can be employed. The sprue bar, 608 and 612 of each sprue bar assembly 600 and 604 respectively is permanently connected to a respective hot runner 616 and 620 in center platen 624 and the extruder 628, nozzle 632 and nozzle adapter 636 are located in a fixed position, as shown. Nozzle adapter 636 splits the resin stream into two streams, as described above, but further includes valves 640 and 644 to control the supply of the resin to each sprue bar 608 and 612.

As shown, sprue bar assembly 600 includes a sprue bar sleeve 648 and sprue bar assembly 604 includes a sprue bar sleeve 652. Each sleeve 648 and 652 is sufficiently long so that the end of the respective sprue bar 608, 612 does not exit the sleeve when the tandem mold is in the position wherein the mold fed by hot runner 620 is open to eject the molded part therefrom. As will be apparent to those of skill in the art, while each sprue bar sleeve 648 and 652 must be long enough to ensure that the end of the respective sprue bar 608 and 612 does not exit it when the mold is opened, sprue bar sleeve 648 can be longer than sprue bar sleeve 652, as shown in FIGS. 7 and 8, wherein sprue bar sleeve 648 acts as thermal insulation for sprue bar 608.

While FIGS. 7 and 8 show sprue bars 608 and 612 connecting to center platen 624 via ninety degree bends, it will be understood by those of skill in the art that such connections can be in the form of curved elbows or can be accomplished via connector blocks or another suitable means as will occur to those of skill in the art and which can be required to accommodate various resins and/or pressures, etc.

Figure 9:
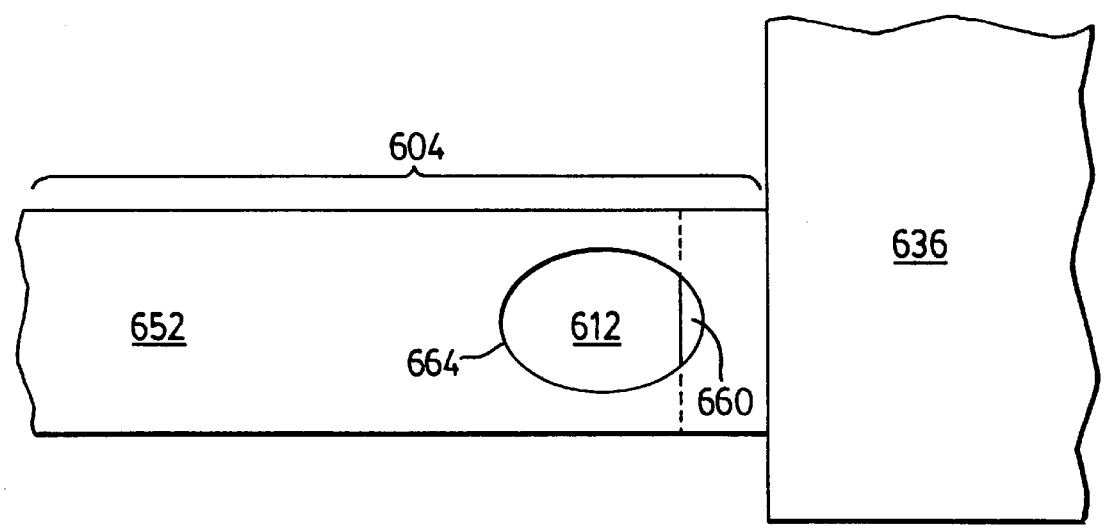
FIG. 9 shows a portion of the tandem mold of FIGS. 7 and 8 taken in the direction indicated by the arrow labeled 9 in FIG. 8.

As will be apparent, the requirement for both a secondary clamping means and the means to move the injector and extruder is eliminated by the embodiment shown in FIGS. 7 and 8. As with the embodiments described above, with reference to FIGS. 3, 4 and 5, sprue bars 608 and 612 each include a bushing 660 to sealingly engage nozzle adapter 636. Further, each of sprue bars 608 and 612 can include a scraper (not shown), as described above, to sweep drool captured within their respective sleeves 648 and 652 from the sprue bar assemblies 600 and 604. However, unlike the embodiment previously described, each sprue bar sleeve 648 and 652 includes an aperture 664, best seen in FIG. 9, on its lower surface, adjacent nozzle adapter 636, to allow drool to exit the interior of the sleeves as the sprue bars engage nozzle adapter 636 and be captured by drool tray 668, or any other suitable means as will occur to those of skill in the art.

The operation of the machine of FIGS. 7 and 8 is similar to the conventional operation of a tandem machine, as described above, with the exception that the two sprue bars 608 and 612 disengage from nozzle adapter 636 when center platen 624 is moved away from fixed platen 656 and sleeves 648 and 652 catch any drool which occurs from the ends of the sprue bars. When center platen 624 is moved toward fixed platen 656 to close the molds, the bushings and/or scraper rings on sprue bars 608 and 612 sweep the captured drool through apertures 664 in the bottom of sprue bar sleeves 648 and 652 and then bushings 660 engage nozzle adapter 636. When the mold adjacent fixed platen 656 is to be injected, valve 640 is opened for the injection operation and closed thereafter. When the mold adjacent driven platen 662 is to be injected, valve 644 is opened for the injection operation and closed thereafter.

As will be apparent, the length of sprue bar assemblies 600 and 604 and their associated sprue bar sleeves 648 and 652 will depend upon the height of the articles to be molded and the position of nozzle adapter 636 relative to the position of center platen 624 when the mold adjacent fixed platen 656 is closed and the height of the article to be molded in the mold adjacent driven platen 662.

It is contemplated that the diameter of the sprue bars in sprue bar assemblies 600 and 604 need not be the same. For example, if the article molded in the mold fed by hot runner 616 is larger (which is often the case) sprue bar 608 in sprue bar assembly 600 can have a larger diameter than sprue bar 612, allowing the larger amount of resin to be supplied more easily to the mold. In such a case, sleeve 648 will also have a correspondingly larger diameter. As above, it will be apparent to those of skill in the art that each mold can be injected with a different resin or resin composition should such be desired. In this case, each sprue bar assembly 600 and 604 will engage a different resin supply and/or nozzle.

It is also contemplated that a single sprue bar assembly can be employed with a tandem machine, the sprue bar of the assembly feeding a pair of valves on the center platen to direct the flow of resin to an appropriate hot runner.

The above-described embodiments of the invention are intended to be examples of the present invention and alterations and modifications may be effected thereto, by those of skill in the art, without departing from the scope of the invention which is defined solely by the claims appended hereto.

We claim:

1. A stack mold comprising:

a fixed mold platen;

at least one center mold platen having a first side adjacent said fixed mold platen and a second side opposite said first side, said center mold platen including a mold hot runner and being movable with respect to said fixed mold platen;

a driven mold platen distal said fixed mold platen and said at least one center mold platen and movable with respect to said fixed mold platen and said at least one center mold platen, said driven mold platen connected to a mold clamping unit operable to move said at least one center mold platen and said driven mold platen to close said stack mold such that a first complete mold cavity is formed between said fixed mold platen and said first side of said at least one center mold platen and a second complete mold cavity is formed between said second side of said center platen and said driven mold platen;

a sprue bar extending from, and in fluid connection with, said mold hot runner in said at least one center platen, said sprue bar having a bushing distal said mold hot runner to engage an injection nozzle and having a length sufficient to permit said bushing to engage said injection nozzle when said stack mold is closed; and a sprue bar sleeve for said sprue bar, said sprue bar sleeve extending substantially perpendicularly with respect to said fixed mold platen from an injection machine nozzle reception area toward said mold hot runner such that said bushing of said sprue bar slides within said sprue bar sleeve, said sprue bar sleeve having a sufficient length such that said bushing does not exit said sprue bar sleeve when said center platen is distal said fixed platen and said bushing extending from said sprue bar sleeve to engage said nozzle when said first complete cavity closed.

2. A stack mold according to claim 1 wherein said stack mold is a tandem mold and wherein said center platen comprises two mold hot runners each having a sprue bar connected thereto and each sprue bar having associated therewith a respective sprue bar sleeve.

3. A stack mold according to claim 2 wherein each said sprue bar engages a separate injection nozzle.

4. A stack mold according to claim 2 wherein each said sprue bare engages a nozzle which divides a stream of resin to be injected, said nozzle further including valve means operable to connect and disconnect each of said two sprue bars to said stream of resin.

5. A stack mold according to claim 1 wherein said sprue bar further includes a scraper means adjacent said bushing to engage the interior surface of said sprue bar sleeve to remove foreign matter therefrom as said sprue bar moves through said sprue bar sleeve toward said fixed platen.

6. A stack mold according to claim 4 wherein said sprue bar further includes a scraper means adjacent said bushing to engage the interior surface of said sprue bar sleeve to remove foreign matter therefrom as said sprue bar moves through said sprue bar sleeve toward said fixed platen.

7. A stack mold according to claim 1 wherein said sprue bar sleeve includes a layer of material which acts as a thermal insulator.

8. A stack mold according to claim 1 wherein said stack mold is a tandem mold and wherein said center platen comprises two mold hot runners and a valve means, said valve means operable to connect each of said two mold hot runners to said sprue bar.

9. A stack mold according to claim 1 comprising at least two center platens movable with respect to said fixed platen, said first complete mold cavity being formed between said fixed platen and an opposed side of a center platen adjacent said fixed platen and second complete mold cavity being formed between said driven platen and an opposed side of an adjacent center platen and at least one additional complete mold cavity being formed between pairs of opposed sides of said at least two center platens, each said center platen having a mold hot runner located therein and having a sprue bar mounted thereto and extending toward said fixed platen to bring said bar bushing into engagement with nozzle to supply molten resin to said hot runners, at least one of said sprue bar bushings moving within a sprue bar sleeve.

10. A stack mold according to claim 9 further comprising a sleeve guide to slidably support said sprue bar sleeve at a point distal said fixed platen, said sleeve guide supported in turn by one of said at least two center mold platens.

11. A stack mold according to claim 9 wherein said sprue bar further includes a scraper means adjacent said bushing to engage the interior surface of said sprue bar sleeve to remove foreign matter therefrom as said mold is closed.

12. A stack mold according to claim 9 wherein said sprue bar sleeve includes a layer of material which acts as a thermal insulator.

13. A stack mold according to claim 9 further comprising a sprue bar sleeve for each of said respective sprue bars.

14. A sprue bar assembly for a stack mold having a fixed mold platen, at least one moveable center mold platen having at least one mold hot runner, and a driven mold platen, said sprue bar assembly comprising:

a sprue bar having a first end to sealingly engage said at least one mold hot runner in one of said at least one moveable center mold platens and a second end distal said at least one mold hot runner and including a bushing to engage an injection molding machine nozzle;

a sprue bar sleeve to slidably receive said second end of said sprue bar and to capture leakage therefrom, said sprue bar engaging the interior of said sprue bar sleeve to sweep captured leakage therefrom as said second end of said sprue bar slides into said sprue bar sleeve.

15. A sprue bar assembly according to claim 14 further comprising a scraper on said sprue bar adjacent said second end, said scraper engaging the interior of said sprue bar sleeve to sweep capture leakage therefrom.

16. A sprue bar assembly according to claim 14 wherein said sprue bar sleeve is fabricated in part from thermally insulating material.

17. A sprue bar assembly according to claim 16 wherein said material is titanium dioxide.

* * * * *